(12) United States Patent
Seal

(10) Patent No.: US 7,120,779 B2
(45) Date of Patent: Oct. 10, 2006

(54) ADDRESS OFFSET GENERATION WITHIN A DATA PROCESSING SYSTEM

(75) Inventor: David James Seal, Cambridge (GB)

(73) Assignee: ARM Limited, Cambridge (GB)

( * ) Notice: Subject to any disclaimer, the term of this patent is extended or adjusted under 35 U.S.C. 154(b) by 431 days.

(21) Appl. No.: 10/765,092

(22) Filed: Jan. 28, 2004

(65) Prior Publication Data

US 2004/0255094 A1    Dec. 16, 2004

(30) Foreign Application Priority Data

Jun. 11, 2003    (GB)    ................................ 0313510.0

(51) Int. Cl.
*G06F 12/06* (2006.01)

(52) U.S. Cl. .................... 711/220; 712/208; 712/210; 712/225

(58) Field of Classification Search ............... None
See application file for complete search history.

(56) References Cited

U.S. PATENT DOCUMENTS

| 4,203,157 A | 5/1980 | Daniels et al. |
| 5,440,705 A | 8/1995 | Wang et al. |
| 6,049,863 A | * 4/2000 | Tran et al. ............... 712/213 |
| 6,237,087 B1 | * 5/2001 | O'Connor ............... 712/226 |
| 6,948,053 B1 | * 9/2005 | Augsburg et al. ........... 712/233 |
| 2001/0029577 A1 | * 10/2001 | Worrell et al. ............... 712/210 |
| 2003/0212879 A1 | * 11/2003 | Henkel et al. ............... 712/208 |
| 2003/0225998 A1 | * 12/2003 | Khan et al. ................ 712/210 |
| 2004/0049657 A1 | * 3/2004 | Kling ......................... 712/208 |
| 2005/0114633 A1 | * 5/2005 | Palat et al. .................. 712/226 |

FOREIGN PATENT DOCUMENTS

EP    0594969 A1    8/1993

OTHER PUBLICATIONS

ARM Limited, "ARM7TDMI Technical Reference Manual" Sept. 2001, pp. 1-13 to 1-25 & 6-4 to 6-5.
A. Krishnaswamy et al, "Profile Guided Selection of ARM and Thumb Instructions " Association for Computing Machinery, vol. 37, No. 7, Jul. 2002, pp. 56-64.

* cited by examiner

*Primary Examiner*—Mano Padmanabhan
*Assistant Examiner*—Kaushik Patel
(74) *Attorney, Agent, or Firm*—Nixon & Vanderhye P.C.

(57) ABSTRACT

A data processing system 2 is provided supporting address offset generating instructions which encode bits of an address offset value using previously redundant bits in a legacy instruction encoding whilst maintaining backwards compatibility with that legacy encoding.

33 Claims, 5 Drawing Sheets t= 1: BL (= call thumb)
t= 0: BLX (= call ARM)

Address offset generating instruction

| S | $P_1$ | $P_0$ | $B_{N-1}$ | $B_{N-2}$ | $B_{N-3}$ |
|---|---|---|---|---|---|
| 0 | 0 | 0 | - | A | - |
| 0 | 0 | 1 | - | B | - |
| 0 | 1 | 0 | - | C | - |
| 0 | 1 | 1 | 0 | 0 | 0 |
| 1 | 0 | 0 | - | D | - |
| 1 | 0 | 1 | - | E | - |
| 1 | 1 | 0 | - | F | - |
| 1 | 1 | 1 | 1 | 1 | 1 |

{A,B,C,D,E,F} is a permutation of
{001,010,011,100,101,110}

ADDRESS OFFSET GENERATION WITHIN A DATA PROCESSING SYSTEM

BACKGROUND OF THE INVENTION

1. Field of the Invention

This invention relates to the field of data processing systems. More particularly, this invention relates to the generation of an address offset in response to an address offset generating instruction.

2. Description of the Prior Art

It is known to provide data processing systems of the form illustrated in FIG. 1 of the accompanying drawings. This data processing system comprises a processor core including a register bank 4, a multiplier 6, a shifter 8, an adder 10, an instruction pipeline 12 and an instruction decoder 14. It will be understood by those skilled in this technical field that the processor core 2 will typically include many further circuit elements, which have been omitted from FIG. 1 for the sake of clarity. In operation, the processor core 2 fetches program instructions to the instruction pipeline 12 wherein they are decoded by the instruction decoder 14 to generate control signals that act upon the register bank 4, the multiplier 6, the shifter 8 and the adder 10 as well as other circuit elements to control the desired data processing operations as specified by the program instruction being decoded. The processor core 2 is provided with a data bus, an address bus and an instruction bus.

One type of processing operation that can be required is the generation of an address offset value. One example of this type of operation is the BL/BLX instruction which is present in the Thumb mode of operation of Thumb enabled processors produced by ARM Limited of Cambridge, England. FIG. 2 of the accompanying drawings schematically illustrates such instructions. It will be seen that these instructions can be considered as two 16-bit instructions or one 32-bit instruction. The leading five bits (namely 11110) are decoded as indicating that a BL/BLX instruction is present with the remaining eleven bits within the first two bytes being an offset value, including a leading sign bit S, this being offset field 2. This offset value is then followed by a bit pattern 111t1 and a further eleven bits of offset, this being offset field 1. The "t" bit indicates to the instruction decoder 14 whether the instruction is a BL instruction or a BLX instruction. A BL instruction is a branch with link staying within the Thumb mode of operation. A BLX instruction is a branch with link combined with a switch to the ARM mode of operation.

It will be appreciated that the offset values illustrated in FIG. 2 provide twenty two bits. This offset value is sign-extended as required and then added to the branch instruction's address. This offset value range is able to support branch jumps of plus or minus 4 MB to 16-bit halfword-aligned targets.

As application programs increase in complexity, they also tend to increase in size. It is desirable that it should be possible to make an end-to-end branch within a program image if this is required. Accordingly, as application images are becoming larger and greater in size than 4 MB, a problem arises in that the address offset values which are supported in the instructions have an insufficient range.

FIG. 3 schematically illustrates the action of a BL instruction in jumping the program execution flow to a new point. The maximum jump that can be commanded is constrained by the maximum address offset value which may be specified.

A further problem which should be addressed is the need to provide backwards compatibility in any modified form of the instruction. Thus, whilst adopting completely new instruction encodings for the BL/BLX instead of the old encodings might overcome the address offset range problem, it would suffer from the disadvantage of a lack of backwards compatibility with the existing software written using the legacy instructions. Alternatively, adding new encodings in addition to the existing encodings would be disadvantageously wasteful of instruction encoding bit space.

SUMMARY OF THE INVENTION

Viewed from one aspect the present invention provides apparatus for processing data, said apparatus comprising:

an instruction decoder responsive to program instructions to control data processing operations; and an address offset generating circuit controlled by said instruction decoder and operable to generate an N-bit address offset having a value specified by an address offset generating instruction including an offset value sign specifying bit S; wherein said N-bit address offset has bit values $B_i$ when expressed as a two's complement number, where $(N-1) \geq i \geq Z$ and $(N-1) > Z \geq 0$, said address offset generating instruction includes L high order field bits $P_k$, where $(N-Z) > L \geq 1$ and $L > k \geq 0$, and said address offset generating circuit is operable such that:

(i) if all of said high order field bits $P_k$ have respective predetermined values $D_k$, then bits $B_j$ of said N-bit address offset are given by $B_j = S$ for all values of j such that $(N-1) \geq j \geq (N-L-1)$; and (ii) if any of said high order field bits $P_k$ does not have said predetermined value $D_k$, then bits $B_j$ of said N-bit address offset, where $(N-1) \geq j \geq (N-L-1)$, are given by a predetermined one-to-one mapping from combinations of values of said high order field bits $P_k$ and said offset value sign specifying bit S to combinations of values of $B_j$ other than the combination $B_j = 1$ for all values of j such that $(N-1) \geq j \geq (N-L-1)$ and the combination $B_j = 0$ for all values of j such that $(N-1) \geq j \geq (N-L-1)$.

The invention recognises that some bits within the existing address offset generating instructions may be redundant in that they are not required to positively identify and accordingly decode the instruction concerned (e.g. once the first 16 bits of a BL/BLX have been identified the following 16 bits are constrained to be the second half of either a BL instruction or a BLX instruction) and accordingly those bits may be used to instead encode additional address offset information thereby extending the address offset range. However, in order to support backwards compatibility with existing software the encoding used to represent the extra bits of the address offset value must be such that when legacy code is executed in which the extra bits have fixed values (the respective predetermined values), then those fixed values will be decoded in a way that generates the same offset value as was originally intended when the legacy software was written, i.e. appropriately sign extended. This is achieved by the encoding of the present technique as specified above. It will be appreciated that the fixed bits in the legacy code which are being reused to represent additional bits of address offset with the present technique could have had previously fixed values of either "0" or "1".

In order to provide backwards compatibility with a previous instruction set a preferred encoding is one in which said respective predetermined values of said high order field bits $P_k$ are all equal to 1.

In preferred embodiments said address offset generating circuit is operable to generate bit $B_j$ values of said N-bit address offset each bit value $B_j$ having a value given by a respective predetermined one of:

$B_j=S$ for one directly sign bit specified value of j;

$B_j=S$ XOR $P_{k(j)}$ XOR $D_{k(j)}$ where $k_{(j)}$ is a one-to-one index mapping from values of j, excluding said directly sign bit specified value of j, to values of k.

This has the advantage that copying the sign bit to one bit position, and use of exclusive-OR function (when the predetermined value is 0) or an exclusive-NOR function (when the predetermined value is 1) for the others is an especially simple way to generate $B_j$ values that meet the required conditions.

In preferred embodiments said directly sign bit specified value of j is N−1. It is advantageous if the sign bit of the final offset can be obtained directly from the instruction encoding, without requiring an exclusive-(N)OR function to be evaluated. As an example, this may be advantageous because the sign bit of the final offset may need to be replicated, in which case putting the buffering delay in parallel with the exclusive-(N)OR delay rather than in series with it reduces critical paths. Another reason why it may be advantageous is that some branch prediction schemes pay attention to the direction of a branch instruction, and so may want to know the sign of the offset without knowing its exact value.

It will be appreciated that because $D_k$ is a predetermined value, the formula may be implemented with a single exclusive-OR or exclusive-NOR gate, since the formula simplifies to $B_j=S$ XOR $P_{k(j)}$ if the predetermined value is 0 and to $B_j=$NOT(S XOR $P_{k(j)}$) if the predetermined value is 1. (If $D_k$ were not a predetermined value, two exclusive-(N) OR gates in series to an equivalent circuit would be required.)

It will be appreciated that the address offset generating instruction could have a variety of different forms and is not necessarily limited to branch instructions. However, the present invention is particularly well suited for use in branch instructions.

When using a branch instruction, preferred embodiments combine the branch target address offset with the current program address to generate a branch target address to which the program jumps.

Whilst the invention is suitable to various different sizes of instructions, it is particularly useful in embodiments in which k=2, N=25 and Z=1 or 2. These advantageously balance bit space allocated to the offset value specification and bit space allocated to the opcode and other parameters.

The bits of the address offset value not being specified by the new technique also need to be specified within the address offset generating instruction. These could be encoded in a variety of different ways, but it is advantageously simple when these are directly specified by fields within the address offset generating instruction.

Viewed from another aspect the present invention provides a method of processing data, said method comprising the steps of:

controlling data processing operations using an instruction decoder responsive to program instructions; and generating an N-bit address offset having a value specified by an address offset generating instruction including an offset value sign specifying bit S using an address offset generating circuit controlled by said instruction decoder; wherein said N-bit address offset has bit values $B_i$ when expressed as a two's complement number, where $(N-1) \geq i \geq Z$ and $(N-1) > Z \geq 0$, said address offset generating instruction includes L high order field bits $P_k$, where $(N-Z) > L \geq 1$ and $L > k \geq 0$, and said address offset generating circuit is operable such that:

(i) if all of said high order field bits $P_k$ have respective predetermined values $D_k$, then bits $B_j$ of said N-bit address offset are given by $B_j=S$ for all values of j such that $(N-1) \geq j \geq (N-L-1)$; and (ii) if any of said high order field bits $P_k$ does not have said predetermined value $D_k$, then bits $B_j$ of said N-bit address offset, where $(N-1) \geq j \geq (N-L-1)$, are given by a predetermined one-to-one mapping from combinations of values of said high order field bits $P_k$ and said offset value sign specifying bit S to combinations of values of $B_j$ other than the combination $B_j=1$ for all values of j such that $(N-1) \geq j \geq (N-L-1)$ and the combination $B_j=0$ for all values of j such that $(N-1) \geq j \geq (N-L-1)$.

Viewed from a further aspect the present invention provides a computer program product including a computer program for controlling a computer to perform the steps of:

controlling data processing operations using an instruction decoder responsive to program instructions; and generating an N-bit address offset having a value specified by an address offset generating instruction including an offset value sign specifying bit S using an address offset generating circuit controlled by said instruction decoder; wherein said N-bit address offset has bit values $B_i$ when expressed as two's complement number, where $(N-1) \geq i \geq Z$ and $(N-1) > Z \geq 0$, said address offset generating instruction includes L high order field bits $P_k$, where $(N-Z) > L \geq 1$ and $L > k \geq 0$, and said address offset generating circuit is operable such that:

(i) if all of said high order field bits $P_k$ have respective predetermined values $D_k$, then bits $B_j$ of said N-bit address offset are given by $B_j=S$ for all values of j such that $(N-1) \geq j \geq (N-L-1)$; and (ii) if any of said high order field bits $P_k$ does not have said predetermined value $D_k$, then bits $B_j$ of said N-bit address offset, where $(N-1) \geq j \geq (N-L-1)$, are given by a predetermined one-to-one mapping from combinations of values of said high order field bits $P_k$ and said offset value sign specifying bit S to combinations of values of $B_j$ other than the combination $B_j=1$ for all values of j such that $(N-1) \geq j \geq (N-L-1)$ and the combination $B_j=0$ for all values of j such that $(N-1) \geq j \geq (N-L-1)$.

It will be appreciated that the computer program product can take a wide variety of different forms, such as a storage medium or a download from a data connection or the like. Within the computer program product the computer program concerned should include one or more address offset generating instructions utilizing the present technique.

The above, and other objects, features and advantages of this invention will be apparent from the following detailed description of illustrative embodiments which is to be read in connection with the accompanying drawings.

BRIEF DESCRIPTION OF THE DRAWINGS

Embodiments of the invention will now be described, by way of example only, with reference to the accompanying drawings in which.

DESCRIPTION OF THE PREFERRED EMBODIMENTS

Figure 4:
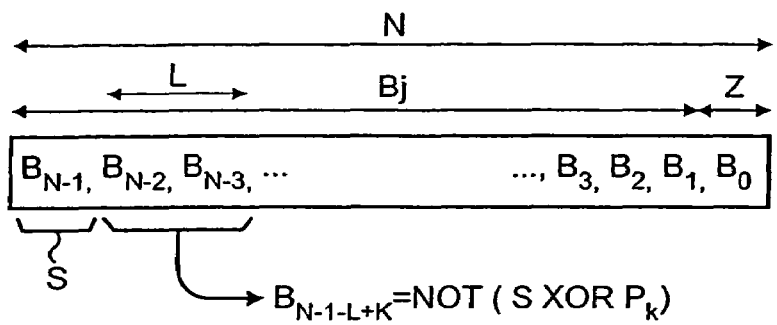
FIG. 4 illustrates an address offset value to be generated.

FIG. 4 illustrates an address offset value being an N-bit value. The least significant Z bits of this address offset value need not be represented by the fields within the address generating instruction since they have a fixed value determined by the instruction word size of the program concerned. If the instruction words are 32-bit words and are word-aligned within the memory, then the least significant two bits of the address offset value may be constrained to be "00" and need not be specified within the fields of the address offset generating instruction. Similarly, with 16-bit instructions that are halfword-aligned (16-bit halfwords), the least significant bit of the address offset value may be constrained to be "0" and again this need not be specified within the offset field of the offset generating instruction.

In this example the range $[B_{N-4}:B_1]$ encompass the bits $B_j$ extending between:

the least significant end of the address offset value starting at the position which needs to be specified taking account of the instruction word size; and a position one bit position below the most significant end which was the maximum position which could be specified in the legacy instructions.

In order to extend the addressing range of the address offset value in this example two further bits have been inserted into the address offset value, namely bits $B_{N-2}$ and $B_{N-3}$, with the original sign bit S being moved up to become $B_{N-1}$. These additional bits are derived from the address offset generating instruction in the manner illustrated. More particularly, these additional bits are specified by a respective one of the additional bits which are being reused to provide the encoding when combined using a logical expression with the most significant bit of the address value which could be specified using the legacy instruction. It will be appreciated that the expression illustrated in FIG. 4 shows the desired relationship but this expression could be rewritten in many different forms. The present technique encompasses all such alternative forms of representing the relationship illustrated in FIG. 4.

Figure 1:
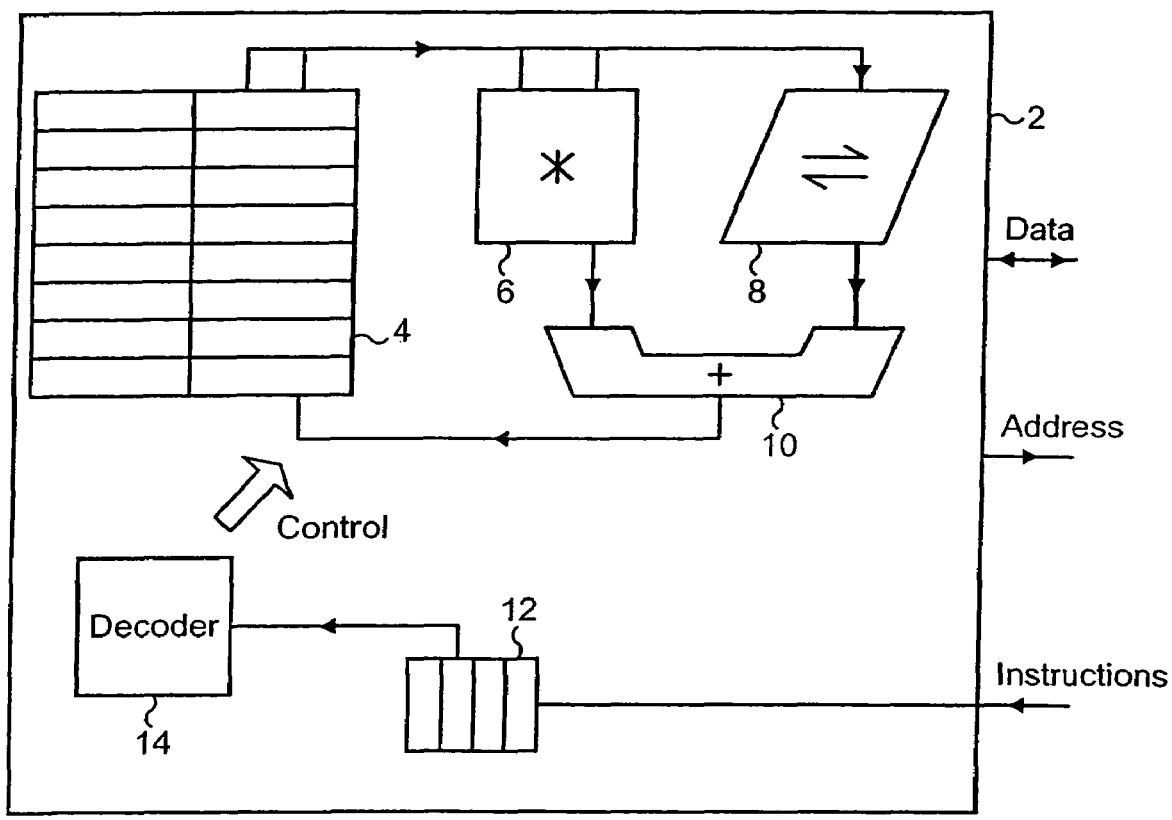
FIG. 1 schematically illustrates a data processing system of the type in which the present technique may be used.
Figure 2:
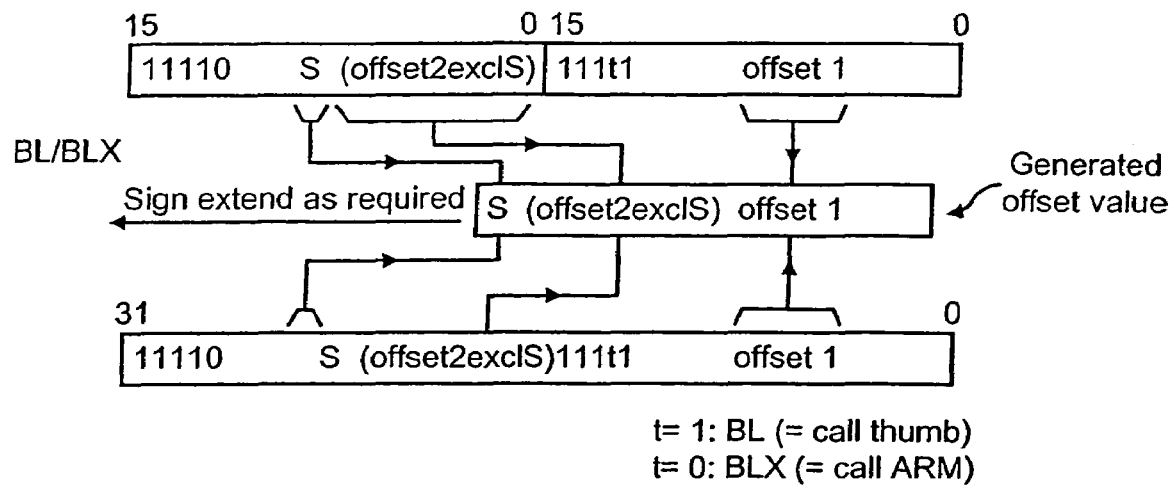
FIG. 2 schematically illustrates a known branch instruction which includes an address offset generating capability.
Figure 3:
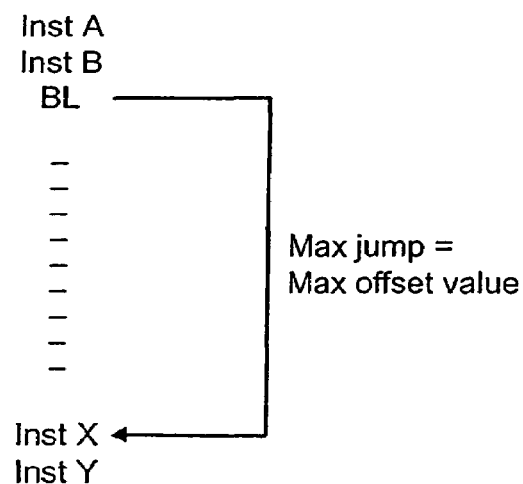
FIG. 3 illustrates the action of a branch instruction such as that of FIG. 2.
Figure 5:
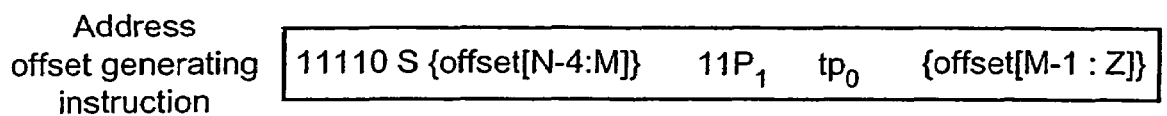
FIG. 5 schematically illustrates an address offset generating instruction for generating the address offset value of FIG. 4.

FIG. 5 schematically illustrates an address offset generating instruction (a new BL/BLX instruction in the ARM/Thumb type of system). Comparing this instruction with FIG. 2, it will be seen that the two bits adjacent to the "t" value have been reused to encode additional information regarding the address offset value in accordance with the logical expression shown in FIG. 4. Thus, the full address offset value is given by the legacy address offset fields together with the two additional bit values interpreted as described above.

Figures 6, 7:
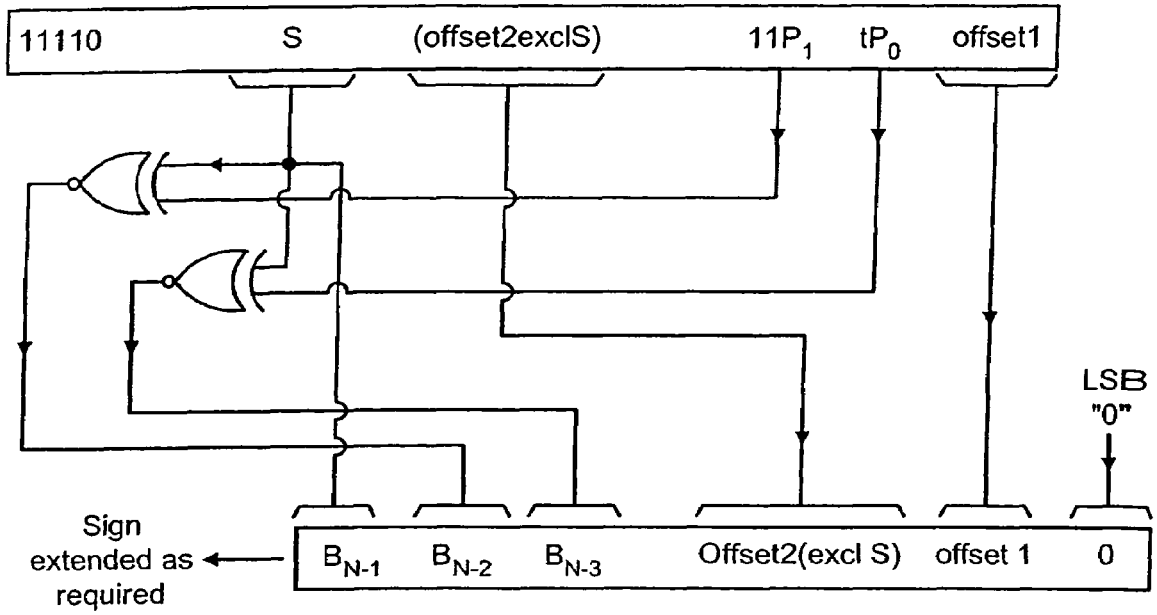
FIG. 6 schematically illustrates example logic for decoding the additional bits from the address generating instruction so as to provide a greater number of bits within the address offset value generated.
FIG. 7 schematically represents an example generalised relationship between the sign and high order field bits with the instruction and the corresponding high order offset value bits that are generated.

FIG. 6 illustrates more directly how the address offset value can be derived from the address offset generating instruction of FIG. 5. Firstly, other than the S bit, the legacy address offset fields are taken directly and put in the same places as before. Then, the two additional bit values encoding the additional address offset information namely $P_1$ and $P_0$ are combined with the sign bit S which is the most significant bit of the legacy offset value using respective logic gates as shown to generate the bits $B_{N-2}$ and $B_{N-3}$ of the extended address offset value. The sign bit S is used directly to provide $B_{N-1}$ of the extended address offset value. The extended address offset value so produced is a 25-bit value (a LSB value of "0" is also incorporated in view of halfword (16-bit halfwords in this example) alignment). The 25-bit value is further sign extended to produce a 32-bit value to be combined with a 32-bit address value (e.g. as part of a branch operation). This combination may be by adding to the branch instruction's PC value, which is its address plus a constant offset (4 in Thumb/Wrist). Other processing operations and combinations of operations which give the same result are also encompassed within the present technique. Thus, in the case of an address offset range which was previously limited to plus or minus 4 MB, this may be extended to plus or minus 16 MB, which is a significant advantage. This extended range is achieved in a manner which is backwards compatible with existing code.

FIG. 7 is a table illustrating a more general relationship between the high order field bits $P_1$ and $P_0$, the sign bit of the offset S and the result three most significant bits $B_{N-1}$ and $B_{N-2}$ and $B_{N-3}$ of the resulting offset value. When $P_1=P_0=1$, this corresponds to the legacy encoding and so all three values $B_{N-1}$ and $B_{N-2}$ and $B_{N-3}$ equal S. This leaves six other possible combinations of S, $P_1$ and $P_0$ which are subject to a one-to-one mapping to the remaining possible 3-bit combinations of $B_{N-1}$ and $B_{N-2}$ and $B_{N-3}$. One example of such a mapping is the one shown in FIGS. 4 and 6.

This mapping is also shown in the following table:

| S | $P_1$ | $P_0$ | $B_{N-1}$ | $B_{N-2}$ | $B_{N-3}$ |
|---|---|---|---|---|---|
| 0 | 0 | 0 | 0 | 1 | 1 |
| 0 | 0 | 1 | 0 | 1 | 0 |
| 0 | 1 | 0 | 0 | 0 | 1 |
| 0 | 1 | 1 | 0 | 0 | 0 |
| 1 | 0 | 0 | 1 | 0 | 0 |
| 1 | 0 | 1 | 1 | 0 | 1 |
| 1 | 1 | 0 | 1 | 1 | 0 |
| 1 | 1 | 1 | 1 | 1 | 1 |

Figure 8:
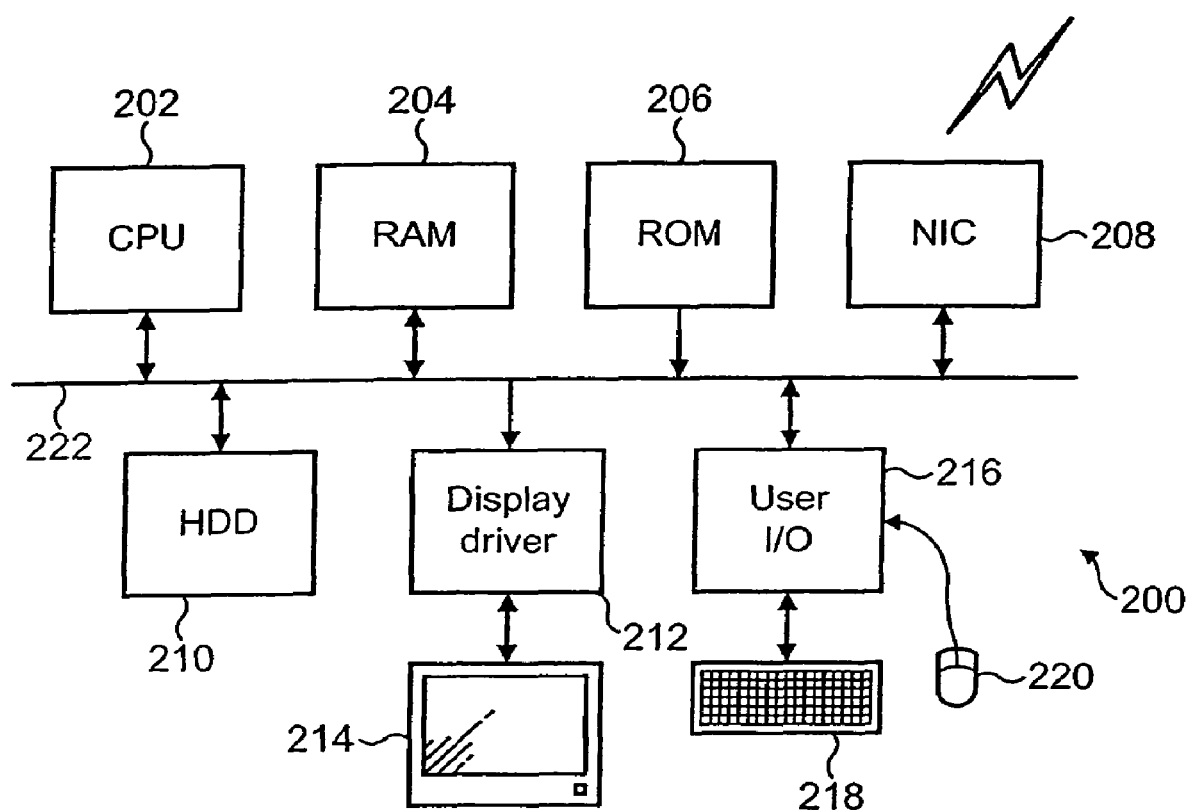
FIG. 8 schematically illustrates the architecture of a general purpose computer which may implement program instructions in accordance with the current techniques.

FIG. 8 schematically illustrates a general purpose computer 200 which may implement program instructions in accordance with the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 8 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
    an instruction decoder responsive to program instructions to control data processing operations; and
    an address offset generating circuit controlled by said instruction decoder and operable to generate an N-bit address offset having a value specified by an address offset generating instruction including an offset value sign specifying bit S; wherein
    said N-bit address offset has bit values $B_i$ when expressed as a two's complement number, where $(N-1) \geq i \geq Z$ and $(N-1) > Z \geq 0$, said address offset generating instruction includes L high order field bits $P_k$, where $(N-Z) > L \geq 1$ and $L > k \geq 0$, and said address offset generating circuit is operable such that:
    (i) if all of said high order field bits $P_k$ have respective predetermined values $D_k$, then bits $B_j$ of said N-bit address offset are given by $B_j = S$ for all values of j such that $(N-1) \geq j \geq (N-L-1)$; and
    (ii) if any of said high order field bits $P_k$ does not have said predetermined value $D_k$, then bits $B_j$ of said N-bit address offset, where $(N-1) \geq j \geq (N-L-1)$, are given by a predetermined one-to-one mapping from combinations of values of said high order field bits $P_k$ and said offset value sign specifying bit S to combinations of values of $B_j$ other than the combination $B_j = 1$ for all values of j such that $(N-1) \geq j \geq (N-L-1)$ and the combination $B_j = 0$ for all values of j such that $(N-1) \geq j \geq (N-L-1)$.

2. Apparatus as claimed in claim 1, wherein said predetermined values $D_k$ are all equal to 1.

3. Apparatus as claimed in claim 1, wherein said address offset generating circuit is operable to generate bit $B_j$ values of said N-bit address offset each bit value $B_j$ having a value given by a respective predetermined one of:
    $B_j = S$ for one directly sign bit specified value of j;
    $B_j = S$ XOR $P_{k(j)}$ XOR $D_{k(j)}$ where k(j) a one-to-one index mapping from values of j, excluding said directly sign bit specified value of j, to values of k.

4. Apparatus as claimed in claim 3, wherein said directly sign bit specified value of j is N−1.

5. Apparatus as claimed in claim 1, wherein said address offset generating instruction is a branch instruction and said N-bit address offset is an N-bit branch target address offset.

6. Apparatus as claimed in claim 5, wherein said N-bit branch target address offset is combined with a program address of said branch instruction to generate a branch target address.

7. Apparatus as claimed in claim 1, wherein said N-bit address offset is further sign extended by said address offset generating instruction prior to use.

8. Apparatus as claimed in claim 1, wherein L=2.

9. Apparatus as claimed in claim 1, wherein N=25.

10. Apparatus as claimed in claim 1, wherein Z is one of 1 and 2.

11. Apparatus as claimed in claim 1, wherein bit values $B_{N-2-L}$ to $B_Z$ are directly specified in said address offset generating instruction.

12. A method of processing data, said method comprising the steps of:
    controlling data processing operations using an instruction decoder responsive to program instructions; and
    generating an N-bit address offset having a value specified by an address offset generating instruction including an offset value sign specifying bit S using an address offset generating circuit controlled by said instruction decoder; wherein
    said N-bit address offset has bit values $B_i$ when expressed as a two's complement number, where $(N-1) \geq i \geq Z$ and $(N-1) > Z \geq 0$, said address offset generating instruction includes L high order field bits $P_k$, where $(N-Z) > L \geq 1$ and $L > k \geq 0$, and said address offset generating circuit is operable such that:
    (i) if all of said high order field bits $P_k$ have respective predetermined values $D_k$, then bits $B_j$ of said N-bit address offset are given by $B_j = S$ for all values of j such that $(N-1) \geq j \geq (N-L-1)$; and
    (ii) if any of said high order field bits $P_k$ does not have said predetermined value $D_k$, then bits $B_j$ of said N-bit address offset, where $(N-1) \geq j \geq (N-L-1)$, are given by a predetermined one-to-one mapping from combinations of values of said high order field bits $P_k$ and said offset value sign specifying bit S to combinations of values of $B_j$ other than the combination $B_j = 1$ for all values of j such that $(N-1) \geq j \geq (N-L-1)$ and the combination $B_j = 0$ for all values of j such that $(N-1) \geq j \geq (N-L-1)$.

13. A method as claimed in claim 12, wherein said predetermined values $D_k$ are all equal to 1.

14. A method as claimed in claim 12, wherein said address offset generating circuit is operable to generate bit $B_j$ values of said N-bit address offset each bit value $B_j$ having a value given by a respective predetermined one of:
    $B_j = S$ for one directly sign bit specified value of j;
    $B_j = S$ XOR $P_{k(j)}$ XOR $D_{k(j)}$ where k(j) is a one-to-one index mapping from values of j, excluding said directly sign bit specified value of j, to values of k.

15. A method as claimed in claim 14, wherein said directly sign bit specified value of j is N−1.

16. A method as claimed in claim 12, wherein said address offset generating instruction is a branch instruction and said N-bit address offset is an N-bit branch target address offset.

17. A method as claimed in claim 16, wherein said N-bit branch target address offset is combined with a program address of said branch instruction to generate a branch target address.

18. A method as claimed in claim 12, wherein said N-bit address offset is further sign extended by said address offset generating instruction prior to use.

19. A method as claimed in claim 12, wherein L=2.

20. A method as claimed in claim 12, wherein N=25.

21. A method as claimed in claim 12, wherein Z is one of 1 and 2.

22. A method as claimed in claim 12, wherein bit values $B_{N-2-L}$ to $B_Z$ are directly specified in said address offset generating instruction.

23. A computer product comprising a computer readable storage medium containing computer readable instructions that when executed are for controlling a computer to perform the steps of:

controlling data processing operations using an instruction decoder responsive to program instructions; and generating an N-bit address offset having a value specified by an address offset generating instruction including an offset value sign specifying bit S using an address offset generating circuit controlled by said instruction decoder; wherein said N-bit address offset has bit values $B_i$ when expressed as a two's complement number, where $(N-1) \geq i \geq Z$ and $(N-1) > Z \geq 0$, said address offset generating instruction includes L high order field bits $P_k$, where $(N-Z) > L \geq 1$ and $L > k \geq 0$, and said address offset generating circuit is operable such that:

(i) if all of said high order field bits $P_k$ have respective predetermined values $D_k$, then bits $B_j$ of said N-bit address offset are given by $B_j = S$ for all values of j such that $(N-1) \geq j \geq (N-L-1)$; and (ii) if any of said high order field bits $P_k$ does not have said predetermined value $D_k$, then bits $B_j$ of said N-bit address offset, where $(N-1) \geq j \geq (N-L-1)$, are given by a predetermined one-to-one mapping from combinations of values of said high order field bits $P_k$ and said offset value sign specifying bit S to combinations of values of $B_j$ other than the combination $B_j = 1$ for all values of j such that $(N-1) \geq j \geq (N-L-1)$ and the combination $B_j = 0$ for all values of j such that $(N-1) \geq j \geq (N-L-1)$.

24. A computer program product as claimed in claim 23, wherein said predetermined values $D_k$ are all equal to 1.

25. A computer program product as claimed in claim 23, wherein said address offset generating circuit is operable to generate bit $B_j$ values of said N-bit address offset each bit value $B_j$ having a value given by a respective predetermined one of:

$B_j = S$ for one directly sign bit specified value of j;

$B_j = S$ XOR $P_{k(j)}$ XOR $D_{k(j)}$ where k(j) is a one-to-one index mapping from values of j, excluding said directly sign bit specified value of j, to values of k.

26. A computer program product as claimed in claim 25, wherein said directly sign bit specified value of j is N−1.

27. A computer program product as claimed in claim 23, wherein said address offset generating instruction is a branch instruction and said N-bit address offset is an N-bit branch target address offset.

28. A computer program product as claimed in claim 27, wherein said N-bit branch target address offset is combined with a program address of said branch instruction to generate a branch target address.

29. A computer program product as claimed in claim 23, wherein said N-bit address offset is further sign extended by said address offset generating instruction prior to use.

30. A computer program product as claimed in claim 23, wherein L=2.

31. A computer program product as claimed in claim 23, wherein N=25.

32. A computer program product as claimed in claim 23, wherein Z is one of 1 and 2.

33. A computer program product as claimed in claim 23, wherein bit values $B_{N-2-L}$ to $B_Z$ are directly specified in said address offset generating instruction.

\* \* \* \* \*